July 10, 1934.   C. McEVOY   1,966,017
AUTOMATIC TIME CONTROLLED ANIMAL FEEDER
Filed Oct. 18, 1932   2 Sheets-Sheet 1
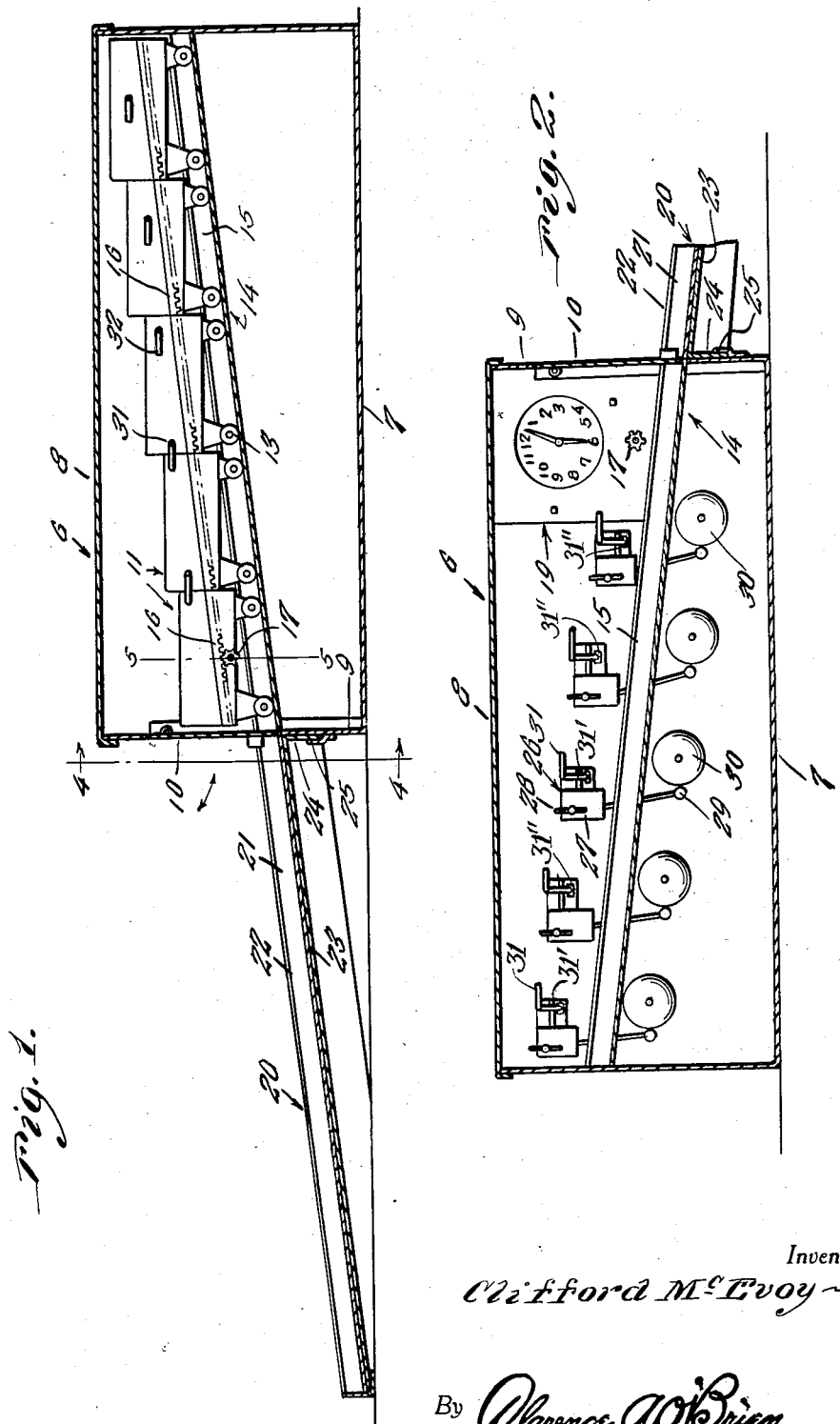
Inventor
Clifford McEvoy
By Clarence A O'Brien
Attorney

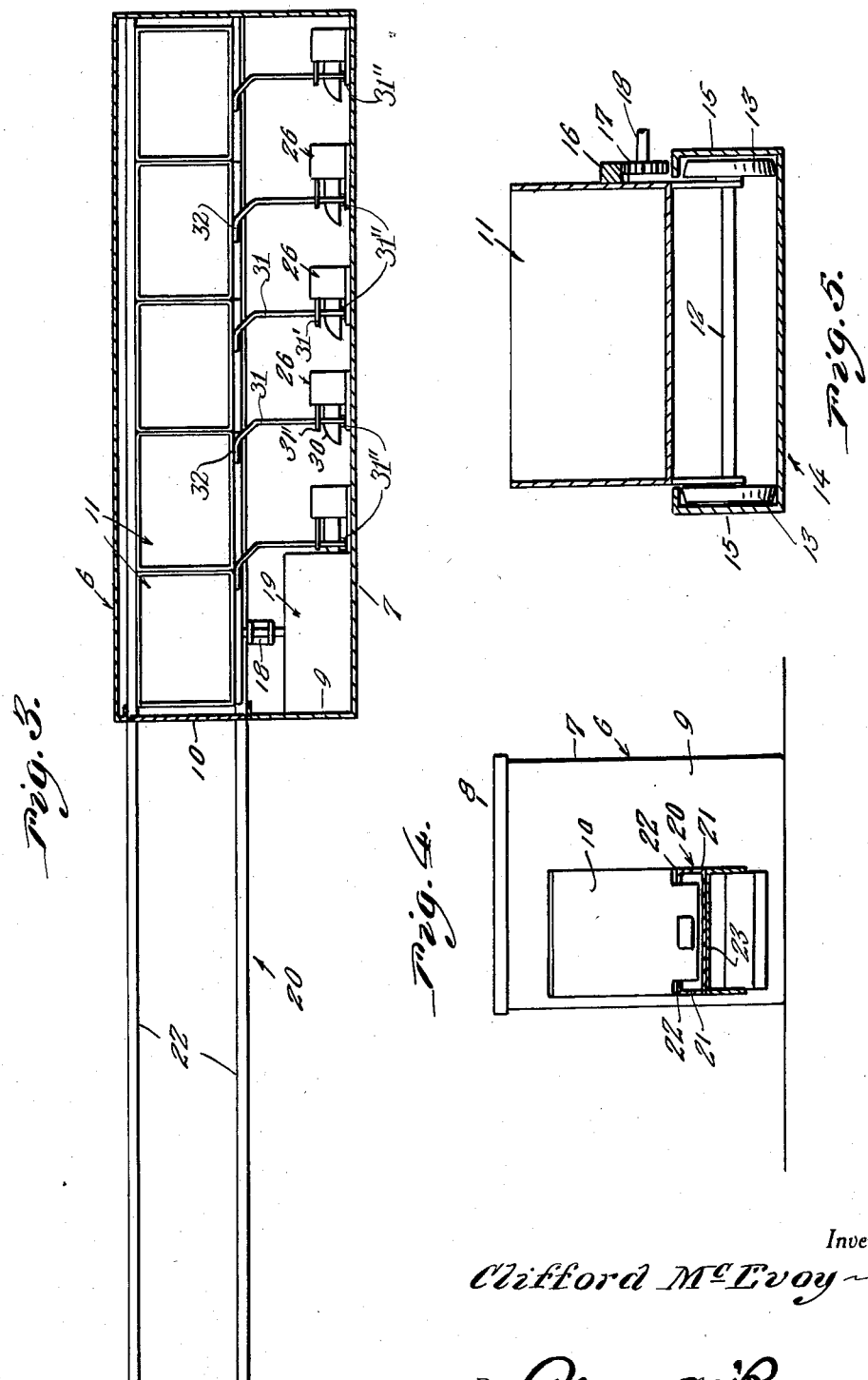

Patented July 10, 1934

1,966,017

UNITED STATES PATENT OFFICE 1,966,017

AUTOMATIC TIME-CONTROLLED ANIMAL FEEDER

Clifford McEvoy, Pittsburgh, Pa.

Application October 18, 1932, Serial No. 638,374

3 Claims. (Cl. 161—10)

This invention relates to an improved automatically operable alarm clock-controlled meal dispenser for household pets, such as for example, cats and dogs.

By way of introduction, I desire to point out that the structural distinctions and novelty found in the invention of this application is predicated upon a refined and revised organization forming an amplification of a similar invention illustrated, described and claimed in my co-pending application, Serial No. 630,292, filed under date of August 24, 1932.

The gist of the invention exemplified in the aforesaid pending case is found in the provision of a portable enclosure, such as a box or the like, wherein a track is located in the enclosure to accommodate a mobile meal containing pan, and wherein time control means is associated with the pan for normally maintaining it in an accessible position within the confines of the enclosure, and at a predetermined time, permitting it to move by gravity down the track to an accessible feeding position.

In furthering the idea just briefly described, I have evolved and produced an improved structural assembly having an enlarged capacity and facilities for minimizing the efforts and work of the attendant in that it is characterized by a series of successively and intermittently operable meal containing and delivering pans or trays.

Briefly, in addition to the multiple pan assembly I call attention to the provision of a single clock-work mechanism for successively releasing and holding the pans, and a plurality of audible signals which are brought into play at the proper time to notify the animal when the trays are progressively released at the predetermined meal periods.

With this improved arrangement, it is possible to provide the animal with a complete feeding through the instrumentality of the periodically released pans.

Other features and advantages of the invention will become more readily apparent from the following description and drawings.

In the drawings:

Figure 1 is a view in section and elevation illustrating the preferred embodiment of the improved structural arrangement.

Figure 2 is a similar longitudinal sectional view with the pans removed to show the internal details.

Figure 3 is a horizontal sectional view.

Figure 4 is a transverse vertical section on the plane of the line 4—4 of Figure 1.

Figure 5 is an enlarged detail transverse section on the line 5—5 of Figure 1.

Referring now to the illustrative drawings, wherein like numerals are employed to designate like parts throughout the views, the enclosure or housing is generally denoted by the numeral 6. This comprises an open-top rectangular box 7 of appropriate proportions having a removable cover or lid 8 to permit access to be had to the interior thereof.

The front wall 9 is provided with a passage or opening normally closed by a hingedly mounted trap door 10, which door permits the passage of the meal containing and delivery pans or trays 11 from the box. In the present arrangement, I provide a plurality of these pans, any suitable number being employed according to the results desired.

Each pan is of simple form, and, as shown in Figure 5, has a pair of axles 12 provided with appropriate rollers or wheels 13 shaped and proportioned to co-operate with the inclined track 14. The track is of trough-like form and embodies spaced parallel side confining walls 15.

Each pan is provided on one side with a toothed rack bar 16 whose teeth are located to mesh with a releasing and retaining pinion 17. The pinion is carried by the rotary shaft 18 of a clock 19 of appropriate construction. Obviously, when the shaft 18 is set into rotation, it rotates the pinion 17 which feeds the lower-most pan downwardly along the track and out through the door 10. As will be seen, each pan is moved downwardly by the engagement of the pinion 17 with the rack teeth 16 and the pressure of the pan against the door 10 will open the door and when the rack 16 leaves the pinion 17, the pan will continue downwardly along the track extension 20 under the action of gravity. The shaft 18 is rotated from the striker mechanism of the clock which is modified to rotate the pinion 17 a sufficient degree to impart movement to the pan through means of the rack 16, and to move the pan a sufficient distance to cause the rear end of the rack to leave the pinion. The striker mechanism then ceases to operate so that the shaft 18 and the pinion 17 come to rest and the rack of the next pan, which is moving downwardly along the track under the action of gravity, will engage the stationary pinion, which will act as a lock to stop this second pan. However, when the striker mechanism of the clock again comes into operation, the second pan will be forced through the door. The clock is, of course, provided with adjustable means for regulating the periods of operation of the striker mechanism, so that the pans can be fed from the box at the desired intervals of time. Thus as I have stated, the pinion 17 serves to mechanically set the pan into motion and then serves to stop the next succeeding pan to hold it in place until it is ready for use.

At this time I call attention to the detachable track extension unit 20 which constitutes a continuation of the internal track 14. The track 20 is also formed with side confining walls 21 having inturned retaining flanges 22 used to prevent the pans from being bodily lifted out from this particular portion of the track as a precautionary measure against accidental displacement. The numeral 23 merely designates a reinforcing element constituting a part of the track unit which is attached to the bottom of the track and provided at its inner end with a depending retaining lip 24 adapted for quick detachable connection with a keeper bracket 25 on the front wall of the box. The idea here is to make the unit 20 detachable so that it can be stored inside of the box when the box is carried from place to place.

Another feature of the invention is found in the provision of individual audible signals of a mechanical type used to indicate the meal service. I provide a plurality of these signals, that is, one for each pan and each signal is the same in construction and distinguished by the numeral 26. The particular construction thereof is more or less immaterial. It is desirable that each signal embody a spring motor casing 27 (see Figure 2) with a winding key 28 and a hammer 29 to clap the bell 30.

The hammer is released by a latch 31' which is in turn automatically actuated through the instrumentality of an associated trip arm 31. Each trip arm is pivoted to the base of each casing 27, as shown at 31''. The trip arm is formed on its free end 32 to bear against the adjacent pan, as shown in Figure 3. As shown in Figure 2, each trip arm is bent upwardly with its free end 32 bent forwardly and by placing this end 32 against a pan, as shown in Figures 1 and 3, the trip arm is held in raised position with the latch 31' in raised position. On the forward movement of the pan, the end 32 of a trip arm will slide along the side of the pan until the pan passes said end and then the trip arm will drop by gravity, thus loosening the latch 31', which will permit the spring in the casing 26 to operate the hammer 29 and thus sound the alarm. As will be seen, when the first pan is moved through the door at the front of the box, all the pans will move downwardly until stopped by the stationary pinion 17 engaging the rack of the second pan and during this movement of the pans, the last pan will pass beyond the rearmost trip arm so as to release the same and thus the rearmost alarm will be sounded. Then when another pan is discharged, the rearmost pan will move downwardly to its next position and thus the trip arm of the next to the last alarm will be released, so that this alarm will be sounded. During movement of the pans, the bent ends 32 of the trip arms will simply slide along the sides of the pans and pass from one pan to the other without being operated, the last pan operating the various trip arms as it passes the same.

By way of comparison, of the structure herein illustrated with that shown in my co-pending application, Serial No. 630,292, it will be observed that the principal idea in the present arrangement is the adaptation of a multiplicity of individual successively operable automatically controlled pans which move one by one at proper intervals from the interior of the box to the exterior for convenient feeding.

A single alarm clockwork 19 is sufficient for this purpose. It is to be observed however that whereas a single audible signal is employed in the copending case, a series of signals is required in the present arrangement in order to accommodate the progressive or periodic dispensing of the meals. Then too, I call attention to the detachable continuation or extension track unit 20 capable of being stored in the box, and when in use, extending to the desired point beyond the front wall of the box to accommodate the entire series of pans as they are periodically brought into play.

It is thought from the foregoing description that the advantages and novel features of the invention will be readily apparent.

It is to be understood that changes may be made in the construction and in the combination and arrangement of the several parts provided that such changes fall within the scope of the appended claims.

I claim:

1. A domestic animal feeder of the class described comprising a box having a pan discharge opening at one end, a pivoted trap door cooperable with said opening and normally occupying a closed position, an inclined track in said box, a food containing pan mounted on said track, an extension track attached to the box and constituting a continuation of the first-named track and time controlled means for forcing the pan through the door, whereby the pan will pass down the tracks under the action of gravity.

2. A multiple action domestic animal feeder of the class described comprising a box having a pan discharge opening at one end, a pivoted trap door co-operable with said opening and normally occupying a closed position, an inclined track in said box, a plurality of food containing pans mounted on said track, an extension track attached to the box and constituting a continuation of the first-named track for reception of the pans as they are released, a shaft rotatably supported in the box, a pinion on the shaft, clock operated means for periodically rotating the shaft, and a short rack bar on each pan for engaging the pinion, whereby the pan is held stationary by the engagement of the rack bar with the pinion, when the shaft is stationary, and the rotation of the pinion will move the pan, by its engagement with the rack bar thereof, until the rack bar runs off the pinion, the pan then moving along the track under the action of gravity.

3. A multiple action domestic animal feeder of the class described comprising a box having a pan discharge opening at one end, a pivoted trap door co-operable with said opening and normally occupying a closed position, an inclined track in said box, a plurality of food containing pans mounted on said track, an extension track attached to the box and constituting a continuation of the first named track for reception of the pans as they are released, a shaft rotatably supported in the box, a pinion on the shaft, clock operated means for periodically rotating the shaft, a short rack bar on each pan for engaging the pinion, whereby the pan is held stationary by the engagement of the rack bar with the pinion, when the shaft is stationary, and the rotation of the pinion will move the pan, by its engagement with the rack bar thereof, until the rack bar runs off the pinion, the pan then moving along the track under the action of gravity, and means for sounding an alarm each time a pan passes through the door.

CLIFFORD McEVOY.